Patented Nov. 7, 1922.

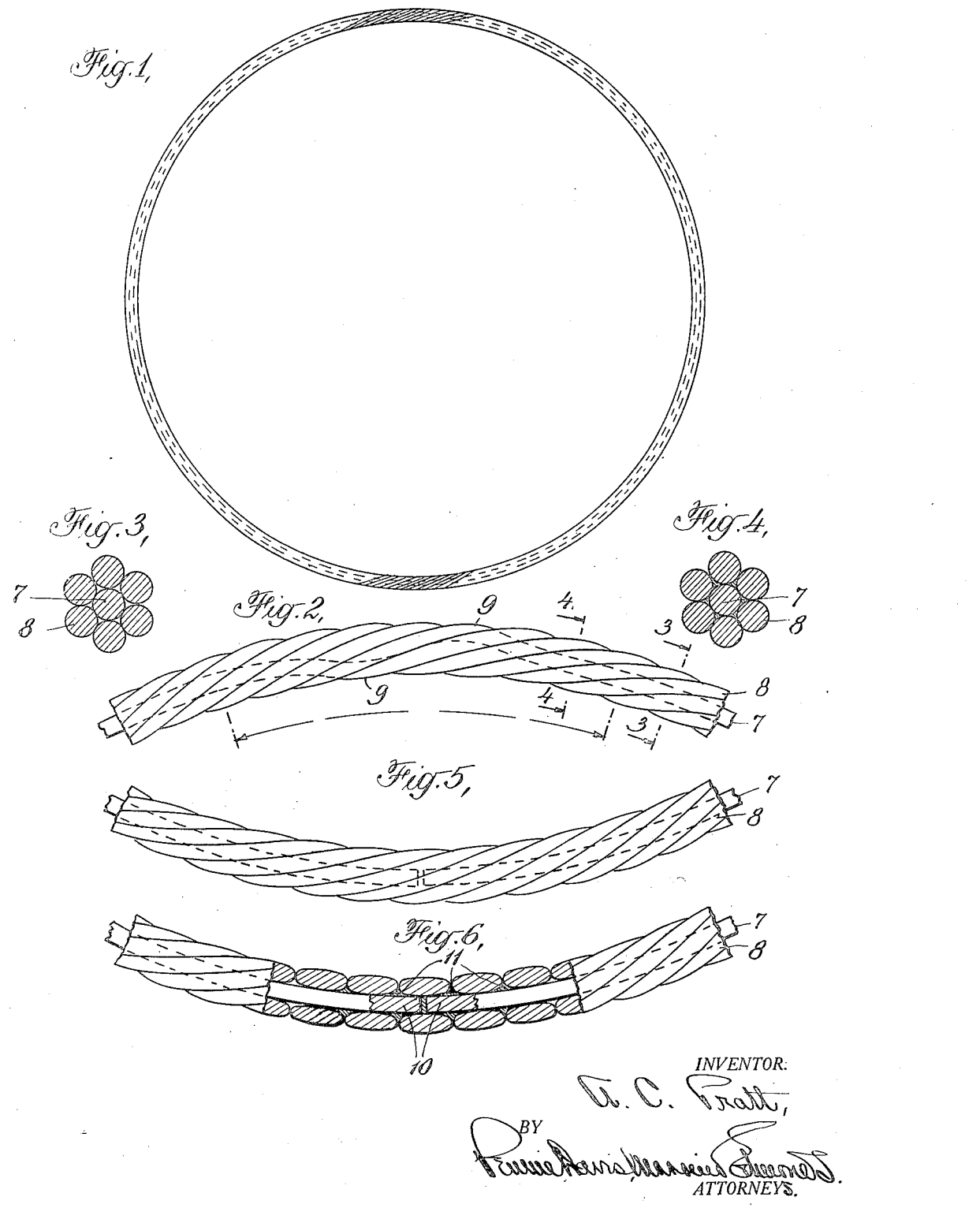

1,434,721

UNITED STATES PATENT OFFICE.

ALPHONSO COMSTOCK PRATT, OF DEEP RIVER, CONNECTICUT, ASSIGNOR TO INTERNATIONAL BEAD WIRE COMPANY, A CORPORATION OF DELAWARE.

BEAD WIRE AND METHOD OF MAKING SAME.

Application filed November 23, 1921. Serial No. 517,170.

*To all whom it may concern:*

Be it known that I, ALPHONSO COMSTOCK PRATT, a citizen of the United States, residing at Deep River, in the county of Middlesex, State of Connecticut, have invented certain new and useful Improvements in Bead Wires and Methods of Making Same; and I do hereby declare the following to be a full, clear, and exact description of the invention, such as will enable others skilled in the art to which it appertains to make and use the same.

This invention relates to bead wires or grommets for use in the construction of automobile tires and consisting of a central core surrounded by a casing made up of a plurality of convolutions of wire wound spirally upon the core. The invention is of special utility in a bead wire in which the core and the surrounding casing of spirals are formed from a single length of wire, the ends of the length of wire forming the core and the intermediate portion forming the plurality of convolutions of spirals which constitute the casing. Bead wires of that construction may be made by employing the method and apparatus described in Letters Patent No. 1,294,160 granted to me February 11, 1919.

When a bead wire constructed in the manner above described is subjected to a bursting strain, the spirals of the casing tend to tighten upon and grip the core. But if the bursting strain is unusually severe, there is a danger that the end portions of the piece of wire forming the core will slip within the surrounding casing of spirals resulting in enlargement of the bead wire and under such circumstances the full strength of the wire from which the grommet is made would not be utilized in resisting the bursting strain.

In accordance with the present invention, the bead wire is so constructed as to eliminate this danger of slippage of the core parts within the casing of spirals and this is done by uniting the core parts to the casing at one or more points about the circumference of the bead wire. In so uniting the several strands from which the bead wire is formed, it is important that there should be no material sacrifice in the flexibility of the bead wire as a whole. To accomplish these ends, the several strands of the grommet, that is, the core and the surrounding spirals, are united at one or more points about the circumference of the bead wire by solder which fills the spaces between the strands over one or more short lengths of the circumference of the bead wire and adheres to the strands to unite them so effectually as to guard against the danger of slippage above referred to. Preferably the soldering together of the several strands of the bead wire is effected at two points about the circumference, one at the so-called crossover where the wire from which the grommet is made passes from the external casing to the internal core, and the other where the ends of the core parts come together.

The invention may be better understood by reference to the following description taken in connection with the accompanying drawings which show the preferred embodiment of the invention.

In these drawings, Fig. 1 is a representation of a completed bead wire; Fig. 2 is an enlarged view of the portion of the bead wire known as the cross-over, as above referred to; Fig. 3 is a cross-section of the bead wire at the line 3—3 of Fig. 2; Fig. 4 is a similar cross-sectional view at the line 4—4 of Fig. 2; Fig. 5 is a view similar to Fig. 2, at the point in the circumference of the bead wire where the ends of the core parts abut; and Fig. 6 is a view similar to Fig. 5 but sectioned longitudinally to show the soldering together of the several strands.

Referring to these drawings, the grommet or bead wire shown in Fig. 2 consists of a core and a casing of spirals surrounding the core and consisting of six convolutions of wire bent to a spiral form, the spirals of the six convolutions lying side by side about the core. This entire bead wire is made from a single length of wire, the ends of that single length forming the core and the intermediate portion the casing of spirals. Each end portion of the piece of wire forms substantially half of the core. In making this bead wire, one of the core parts is first formed and then the wire beyond that core part is given a spiral formation. This spiraled wire is applied to the bead wire to form the exterior casing of spirals lying side by side. Finally, after completing the convolution of spirals, a length of straight wire is provided beyond the spirals of the casing and adapted to form the core part which, with that originally formed, constitutes the entire core. Preferably these two lengths of straight wire which together form the core, are cut off with such accuracy that in the completed bead wire their ends practically abut. This construction of the bead wire is indicated in Fig. 3 wherein 7 indicates the core and 8 the surrounding casing of spirals.

Fig. 2 illustrates the portion of the bead wire known as the cross-over, the dotted lines indicating at 9 how the wire passes from the interior core parts to the exterior casing. Fig. 6 shows the ends 10 of the core parts abutting at a point approximately opposite the cross-over.

At one or more points about the circumference of the bead wire, the several strands making up the completed structure are united for the purpose of preventing slippage of the core parts within the casing of spirals when the bead wire is subjected to a severe bursting strain. This uniting of the several strands is effected by solder which is run into the spaces between the core and the surrounding spirals and adheres to those parts. By using solder for this purpose and applying it over only a short length of the circumference, flexibility of the bead wire is not materially lessened.

The solder is indicated at 11 in Fig. 6 filling the space between the ends of the core parts and filling the spaces between the ends of the core parts and the surrounding spirals. To facilitate the application of the solder, the structure of the completed bead wire may be opened slightly at the point where the solder is to be applied by subjecting it to a strain tending to untwist the spirals.

Preferably a bead wire so constructed is finally subjected to an expanding strain by placing it upon a suitable expanding machine. In this operation, any irregularities of manufacture are compensated for, for instance, if some of the spirals of the casing are not in hard contact with the core at one or more points about the circumference of the bead wire, the strain to which the bead wire is subjected in the operation of the expanding machine draws the spirals down hard upon the core. Also, in so expanding a number of the bead wires for use in the manufacture of automobile tires, they may all be brought to a uniform predetermined diameter.

A bead wire constructed in this manner with its several strands united at one or more points about its circumference, possesses greater strength to resist a bursting strain than one similarly constructed but not having its strands united as the danger of slippage of the core parts within the casing of spirals when the bead wire is subjected to a severe bursting strain is practically eliminated.

I claim:

1. A bead wire consisting of a core and a casing of spirals enclosing the core, the bead wire being formed from a single length of wire whose end portions form the core and whose intermediate portion forms the casing of spirals enclosing the core, the core and the surrounding spirals being united at one or more points about the circumference of the bead wire.

2. A bead wire consisting of a core and a casing of spirals enclosing the core, the bead wire being formed from a single length of wire whose end portions form the core and whose intermediate portion forms the casing of spirals enclosing the core, the ends of the core parts being secured to the spirals of the casing surrounding them.

3. A bead wire consisting of a core and a casing of spirals enclosing the core, the bead wire being formed from a single length of wire whose end portions form the core and whose intermediate portion forms the casing of spirals enclosing the core, the core and the surrounding spirals being soldered together at one or more points about the circumference of the bead wire.

4. A bead wire consisting of a core and a casing of spirals enclosing the core, the bead wire being formed from a single length of wire whose end portions form the core and whose intermediate portion forms the casing of spirals enclosing the core, the ends of the core parts being secured to the spirals of the casing surrounding them by solder filling the spaces between the ends of the core parts and the surrounding spirals and adhering to them.

5. The method of making a bead wire having a core and a casing of spirals surrounding the core, which consists in bending a single continuous piece of wire to form a core from the end portions thereof and to form convolutions of spirals enclosing the core from the intermediate portion thereof and securing the core to the surrounding casing of spirals at one or more points about the circumference of the bead wire.

6. The method of making a bead wire having a core and a casing of spirals surrounding the core, which consists in bending a single continuous piece of wire to form a core from the end portions thereof and to form convolutions of spirals enclosing the core from the intermediate portion thereof and securing the portions of the core formed by the ends of the piece of wire to the spirals of the casing enclosing them.

7. The method of making a bead wire having a core and a casing of spirals surrounding the core, which consits in bending a single continuous piece of wire to form a core from the end portions thereof and to form convolutions of spirals enclosing the core from the intermediate portion thereof and soldering the portions of the core formed by the ends of the piece of wire to the spirals of the casing surrounding them by solder which fills the spaces between the core and the surrounding spirals.

In testimony whereof I affix my signature.

ALPHONSO COMSTOCK PRATT.